(12) United States Patent
Greene et al.

(10) Patent No.: US 7,531,978 B2
(45) Date of Patent: May 12, 2009

(54) SYSTEM AND METHOD FOR CONTROLLING MOTION OF ELECTROMECHANICAL DEVICES SUCH AS SEATS AND OPENING ELEMENTS OF MOTOR VEHICLES

(75) Inventors: Darrell Frederick Greene, Huntsville (CA); Pascal E. Garrido, Kilworthy (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 112 days.

(21) Appl. No.: 11/387,393

(22) Filed: Mar. 23, 2006

(65) Prior Publication Data

US 2007/0241707 A1  Oct. 18, 2007

(51) Int. Cl.
*H02P 7/00* (2006.01)

(52) U.S. Cl. .................. 318/466; 318/268; 318/461; 318/257

(58) Field of Classification Search ......... 318/466, 318/268, 461, 257
See application file for complete search history.

(56) References Cited

U.S. PATENT DOCUMENTS

| | | | | |
|---|---|---|---|---|
| 5,285,139 A | * | 2/1994 | Ogasawara | 318/466 |
| 5,734,245 A | * | 3/1998 | Terashima et al. | 318/453 |
| 5,857,061 A | * | 1/1999 | Chang et al. | 388/829 |
| 5,986,421 A | * | 11/1999 | Fukazawa et al. | 318/466 |
| 6,194,853 B1 | * | 2/2001 | Tual et al. | 318/266 |
| 6,426,609 B2 | * | 7/2002 | Tanaka et al. | 322/19 |
| 6,906,482 B2 | * | 6/2005 | Shimizu et al. | 318/286 |
| 7,023,107 B2 | * | 4/2006 | Okuda et al. | 307/10.1 |
| 7,122,991 B2 | * | 10/2006 | Kitajima et al. | 318/800 |
| 7,161,320 B2 | * | 1/2007 | Shimizu et al. | 318/461 |
| 2005/0057203 A1 | * | 3/2005 | Shimizu et al. | 318/268 |
| 2007/0046236 A1 | * | 3/2007 | McMillan et al. | 318/466 |

FOREIGN PATENT DOCUMENTS

WO  WO 2005/049366  * 6/2005

* cited by examiner

*Primary Examiner*—Bentsu Ro
*Assistant Examiner*—David S Luo
(74) *Attorney, Agent, or Firm*—Porter, Wright, Morris & Arthur, LLP; Richard M. Mescher; Dean B. Watson

(57) ABSTRACT

A system for controlling a displacement drive of a motor vehicle includes a manually operable actuator movable over a fixed stroke between a first end position and a second end position. The actuator is biased to a neutral position centrally located between the first and second end positions and provides a signal representative of position of the actuator. A controller receives the signal from the actuator and produces commands for a reversible DC electric motor of the displacement drive device. The commands vary speed of the drive motor based on the position of the actuator such that the speed of the drive motor is zero at the neutral position, increases in one direction as the actuator moves toward the first end position, and increases in the other direction as the actuator moves toward the second end position.

17 Claims, 4 Drawing Sheets

SYSTEM AND METHOD FOR CONTROLLING MOTION OF ELECTROMECHANICAL DEVICES SUCH AS SEATS AND OPENING ELEMENTS OF MOTOR VEHICLES

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to control systems and methods and, more particularly, to systems and methods for controlling electromechanical displacement drive devices of motor vehicles.

BACKGROUND OF THE INVENTION

Motor vehicles can have many electromechanical devices that include electric motors for displacing components. For example, motor vehicles often have powered seats, powered adjustable pedals, powered windows, powered sun roofs, powered doors, and/or powered lift or tail gates. Each of these devices is typically operated by DC motors. The user typically engages a switch or actuator that activates the motor to move the component in a desired direction such as moving a set forward and rearward or moving a window up and down and releases the switch to deactivate the motor when the component reaches a desired location. These switches typically contact-type switches have two switching states, switched on and switched off.

While these switches may adequately control motion of the components, they do not give the user much control over the motion of the components. Additionally, there is a never ending desire to provide users with enhanced performance, improved responsiveness, and the feel of total control. Particularly in luxury motor vehicles. Accordingly, there is a need in the art for an improved system and method for controlling electromechanical displacement drive devices of motor vehicles.

SUMMARY OF THE INVENTION

The present invention provides a control system and method for electromechanical displacement drive devices of motor vehicle seats. According to the present invention, a system for controlling a displacement drive of a motor vehicle comprises, in combination, a manually operable actuator movable over a fixed stroke between a first end position and a second end position. The actuator is biased to a neutral position located between the first and second end positions and provides a signal representative of position of the actuator along the stroke. A controller is operably connected to the actuator and receives the signal from the actuator. The controller produces commands for a drive motor of the displacement drive device, wherein the commands vary speed of the drive motor based on the position of the actuator over the stroke.

According to another aspect of the present invention, a system for controlling a displacement drive of a motor vehicle comprises, in combination, a manually operable actuator movable over a fixed stroke between a first end position and a second end position. The actuator is biased to a neutral position centrally located between the first and second end positions and provides a signal representative of position of the actuator along the stroke. A controller is operably connected to the actuator and receives the signal from the actuator. The controller produces commands for a reversible DC electric motor of the displacement drive device. The commands vary speed of the drive motor based on the position of the actuator over the stroke such that the speed of the drive motor is zero at the neutral position, increases in one direction as the actuator moves toward the first end position, and increases in the other direction as the actuator moves toward the second end position.

According to yet another aspect of the present invention, a method for controlling a displacement drive of a motor vehicle, said method comprises steps of, in combination, providing a manually operable actuator movable over a fixed stroke between a first end position and a second end position and biasing the actuator to a neutral position located between the first and second end positions. A signal from the actuator is provided representative of position of the actuator along the stroke. A controller operably connected to the actuator and receiving the signal from the actuator is also provided. Commands for a drive motor of the displacement drive device are produces and speed of the drive motor is varied based on the position of the actuator over the stroke.

From the foregoing disclosure and the following more detailed description of various preferred embodiments it will be apparent to those skilled in the art that the present invention provides a significant advance in the technology and art of control systems for electromechanical displacement drive devices of motor vehicles. Particularly significant in this regard is the potential the invention affords for providing a high quality, reliable, low cost system providing responsiveness and a feel of total control. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIGS. 3a and 3b, and 3 are perspective views of the user-input actuator similar to FIG. 3 but showing the actuator in a full rearward and full forward positions respectively;

Figure 1:
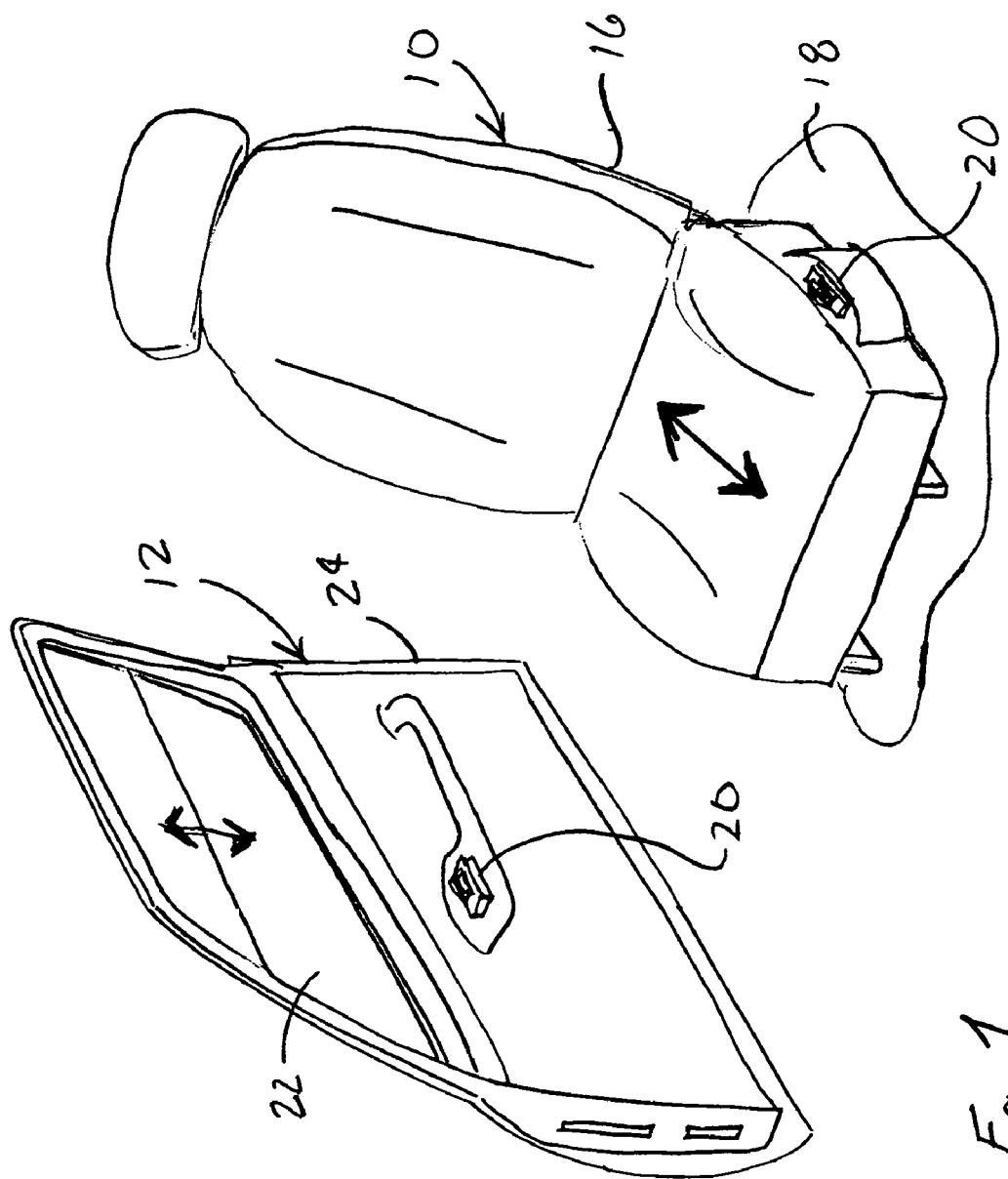
FIG. 1 is a schematic view of a motor vehicle having control systems for electromechanical displacement drive devices according to a preferred embodiment of the present invention, wherein the illustrated devices a powered window and a powered seat.

It should be understood that the appended drawings are not necessarily to scale, presenting a somewhat simplified representation of various preferred features illustrative of the basic principles of the invention. The specific design features of a control system as disclosed herein, including, for example, specific dimensions, orientations, locations, and selections of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the system illustrated in the drawings. In general, up or upward generally refers to an upward direction within the plane of the paper in FIG. 1 and down or downward generally refers to a downward direction within the plane of the paper in FIG. 1. Also in general, fore or forward refers to a direction toward the front of the motor vehicle, that is, generally toward the left within the plane of the paper in FIG. 1 and aft or rearward refers to a direction toward the rear of the motor vehicle, that is, generally toward the right within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved control system disclosed herein. The following detailed discussion of various alternative and preferred embodiments will illustrate the general principles of the invention with reference to a powered seat and a powered window for a motor vehicle such as an automobile, sport utility vehicle (SUV), truck, or the like. Other embodiments suitable for other applications will be apparent to those skilled in the art given the benefit of this disclosure, such as, for example, powered sun roofs, powered doors, powered lift or tail gates, powered adjustable pedals, or any other like powered assemblies utilizing a DC motor.

Figure 2:
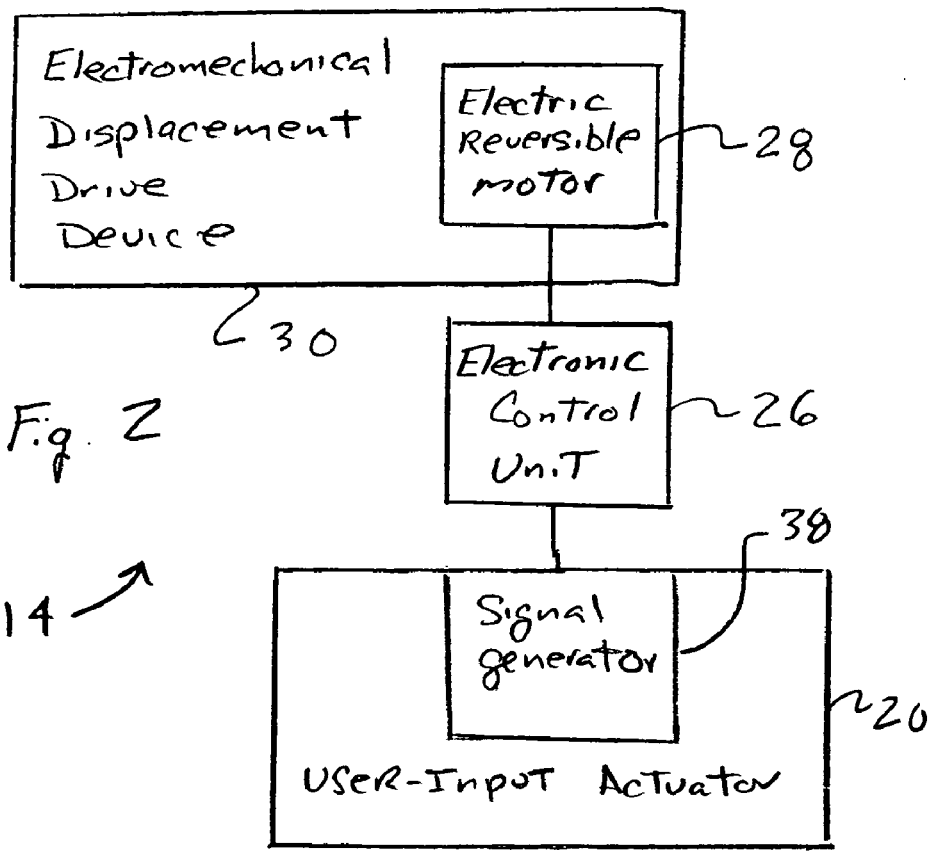
FIG. 2 is a schematic view of the control system of FIG. 1.

Referring now to the drawings, FIGS. 1 and 2 schematically show a powered vehicle seat assembly 10 and a powered widow assembly 12 each having a control system 14 according to a preferred embodiment of the present invention. A position of a seat 16 of the illustrated vehicle seat assembly 10 is linearly adjustable relative to the vehicle floor 18 in the forward/rearward direction by a user manually operating a user-input switch or actuator 20. It is noted that the control system 14 can additionally or alternatively control other motions of the seat assembly 10 such as vertical, recline, and the like. The illustrated actuator 20 is located at a side of the seat 16 but any other suitable location can alternatively be utilized. A position of a glass pane or window 22 of the illustrated vehicle window assembly 12 is linearly adjustable relative to a vehicle door 24 in the upward/downward direction by the user manually operating another user-input switch or actuator 20. It is noted that the control system 14 can additionally or alternatively control other motions of vehicle opening elements such as horizontal, angular, and the like. The illustrated actuator 20 is located at an inner side of the door 24 but any other suitable location can alternatively be utilized. In each case, the actuator 20 provides a signal to a controller or electronic control unit (ECU) 26 that operates a reversible electric motor 28 of a electromechanical displacement drive device 30 of the powered seat assembly 10 or the powered window assembly 12 to move the seat 16 or the window 22 as described in more detail hereinafter.

Figure 3B:
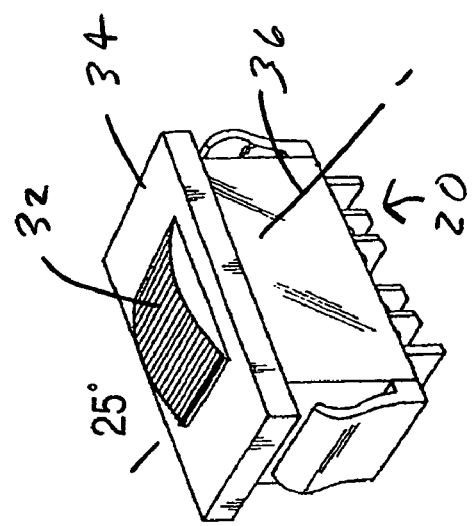
Figure 4:
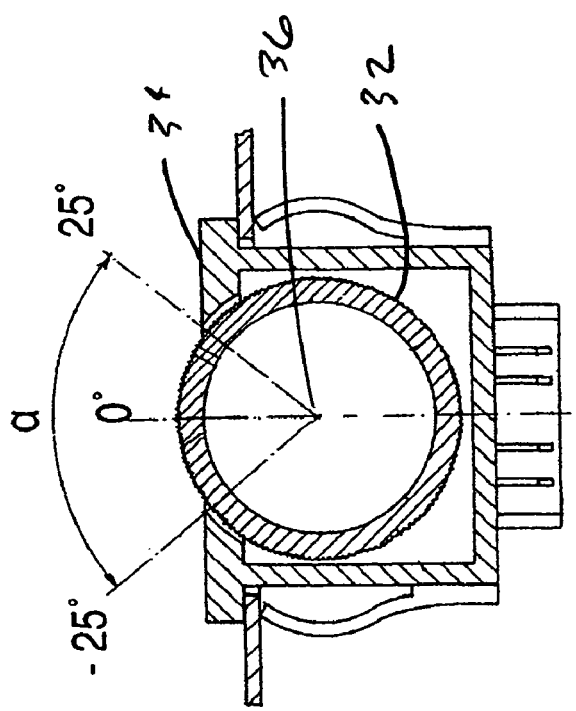
FIG. 4 is a schematic view, in cross-section, of the user-input actuator the control system of FIG. 3.
Figure 3:
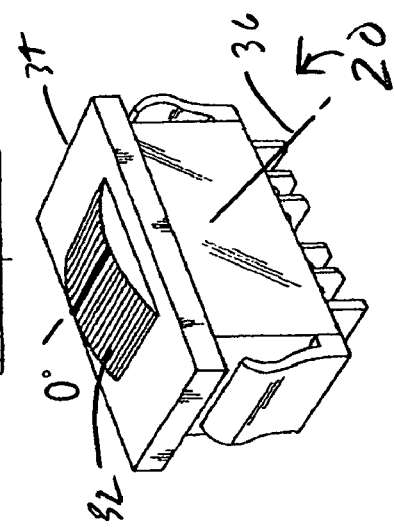
FIG. 3 is a perspective view of a user-input switch or actuator of the control system of FIGS. 1 an 2, wherein the actuator is a rotating knob-type switch and positioned in a center or neutral position of its stroke.
Figure 3A:
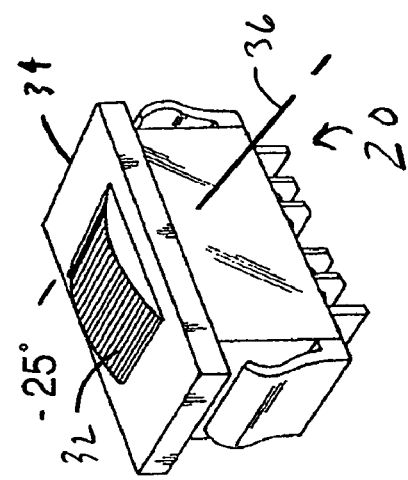

As shown in FIGS. 3 to 4, the illustrated user-input switch or actuator 20 is a rotatable knob-type switch having a knob 32 rotatable over a predetermined or fixed stroke between first and second end positions and biased to a neutral position located between the end positions. The neutral position is preferably centrally located between the first and second end positions but alternatively can be located at any location therebetween. A spring member resiliently biases the knob 32 to the neutral position (shown in FIG. 3) and the user can manually move or rotate the knob 32 from the neutral position in one direction towards the first or full rearward end position (shown in FIG. 3a) and in the opposite direction towards the second or full forward end position (shown in FIG. 3b). If the operator releases the knob 32 when it is any position other than neutral, the spring member resiliently returns the knob 32 to the neutral position. The illustrated actuator 20 has a total stroke of about 50 degrees of rotation and the neutral position is centrally located so that there is +/−25 degrees of rotation from the neutral position. The knob preferably has a fixed stroke of about 10 degrees to about 90 degrees and more preferably has a fixed stroke of about 50 degrees but it is noted that the actuator can alternatively have any other suitable size or type of stroke. The illustrated knob 32 is a cylindrically-shaped knob disposed in a case or housing 34 having an opening through which a part of the knob 32 extends so that a user can engage the knob 32 to rotate the knob 32 about its generally horizontal, laterally-extending rotational axis 36. It is noted, however, that the actuator 20 can alternatively have any other suitable knob or shape and/or can alternatively be any other suitable type of switch or actuator.

Figure 5:
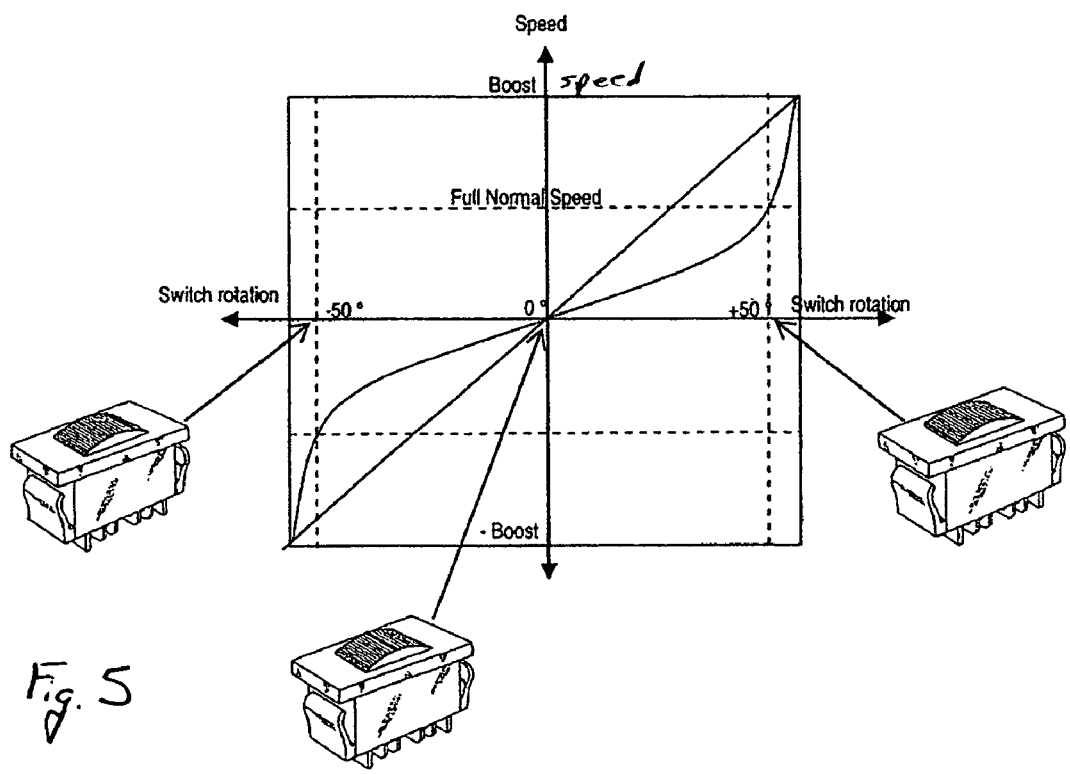
FIG. 5 is a graph showing speed versus switch or actuator position for the control system of FIGS. 1 to 4.

The drive motor 28 is preferably a reversible DC electric motor. The illustrated control system 14 allows for variable speed operation of the drive motor 28 in both the forward direction and the rearward direction giving the operator direct and instant control over the speed of operation of the displacement drive device. The amount of displacement of the actuator 20 (rotational, linear, etc. depending on the type of actuator) determines the speed of the drive motor 28. That is, the operator moves the actuator 20 a little to get a relatively slow speed, moves the actuator 20 further to get a higher speed, and moves the actuator 20 to the end of the stroke to get maximum speed. As shown in FIG. 5, the operating speed can be substantially proportional to the displacement of the actuator 20. That is, a substantially linear relationship between operation speed and actuator position or displacement at constant load. Alternatively, the operating speed can also have a non-linear relationship with the position or displacement of the actuator 20. For example, the speed can increase proportionally greater near or at the end of the stroke. As also shown in FIG. 5, when the control system 14 is provided with an express or boost feature, the speed can increase up to full normal speed and then automatically boosted beyond full normal speed when the actuator 20 is at the end of the stroke. The boost can occur immediately upon the actuator 20 reaching the end position or after a predetermined period of delay.

The actuator 20 includes a signal generator 38 that provides a signal indicative of the direction and displacement of the actuator 20. The signal generator 38 can be an analog device or sensor such as, for example, a potentiometer, hall effect device, or the like or can be a digital device or sensor such as, for example a magnetic or optical device providing pulse counts indicative of position and direction, a hall effect device, a digital encoder, or the like. For example, if the signal generator is a potentiometer having a 5 VDC input, the potentiometer output can be 2.5 V at the neutral position and increase to 5 V in one direction and decrease to 0 V in the other direction of movement. Thus, the level of voltage of the output or signal is proportional to the displacement.

The signal from the signal generator 38 is input to the controller 26 which detects the change in the signal, such as change in voltage, from the signal generator to vary the speed of the drive motor 28 according to the position or displacement of the actuator 20. The controller 26 determines: (1) whether the actuator 20 is no longer at the neutral position, i.e. an actuation has been initiated by the operator; (2) the direction the actuator 20 is being moved, i.e. forward or rearward; (3) the amount of displacement the actuator 20 is moved, i.e. the speed desired by the operator; and (4) the normal maximum speed or target speed of the drive motor 28. The signal from the signal generator 38 serves to multiply the target speed by a factor of less than or equal to 1 to obtain the desired speed.

Figure 6:
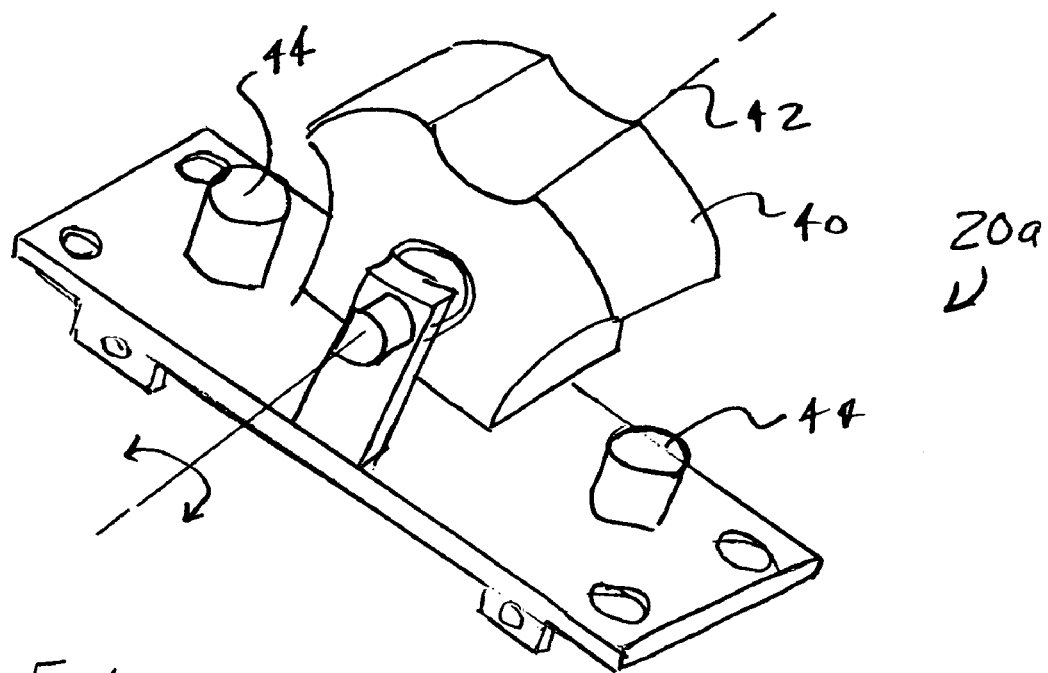
FIG. 6 is a perspective view similar to FIG. 3 but showing an alternative user-input actuator in the form of a rocker-type switch.

FIG. 6 shows an alternative user-input switch or actuator 20a that is a pivotable rocker-type switch having a rocker 40 pivotable over the predetermined or fixed stroke between the first and second end positions and biased to the neutral position located between the end positions. The illustrated rocker 40 pivots about a generally horizontal and laterally-extending pivot axis 42. The rocker-type switch 20a illustrates that the actuator 20 can have a variety of suitable shapes and sizes and a variety of different types of switches and/or actuators. The actuator 20 also shows that contact pads 44 can be provided that are contacted by the rocker 40 at the ends of the stroke to initiate an express or boost feature as described hereinabove.

Figure 7:
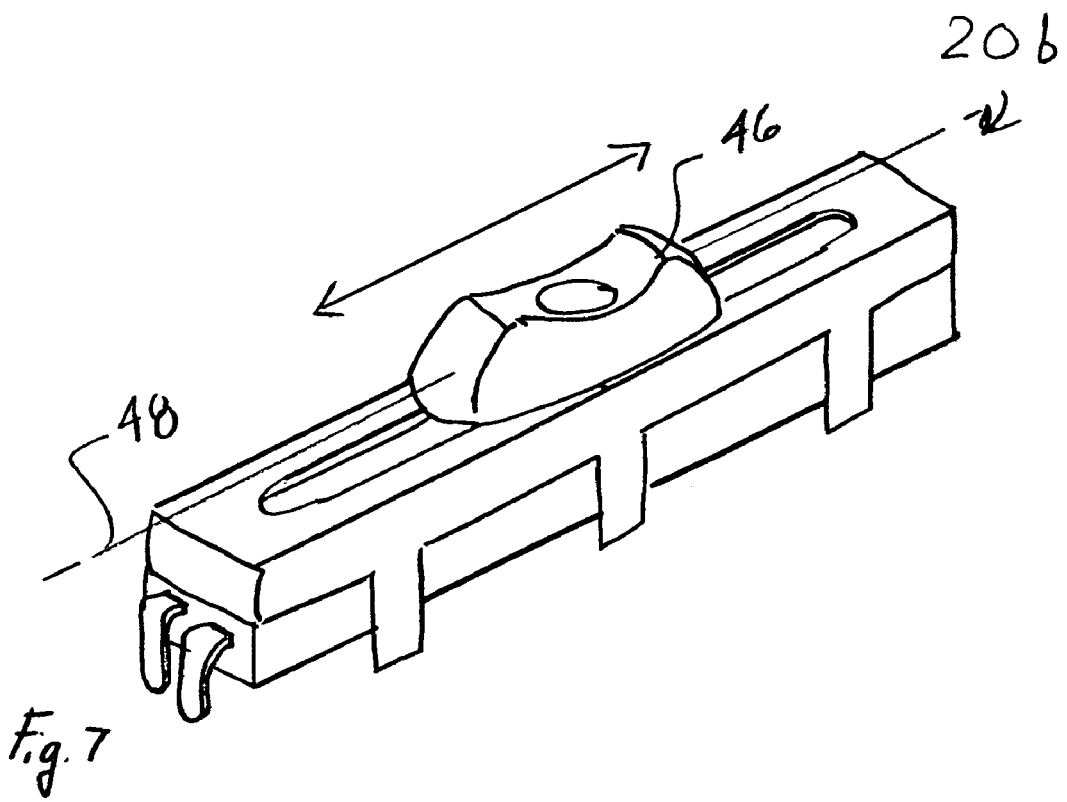
FIG. 7 is a perspective view similar to FIG. 3 but showing another alternative user-input actuator in the form of a slider-type switch.

FIG. 7 shows an alternative user-input switch or actuator 20b that is a linear slider-type switch having a slider member 46 linearly movable or slidable over the predetermined or fixed stroke between the first and second end positions and biased to the neutral position located between the end positions. The illustrated slider member 46 moves or slides along a generally horizontal and longitudinally-extending linear slot or path of travel 48. The slider-type switch illustrates that the actuator 20 an have a variety of suitable motions, a variety of suitable shapes and sizes, and a variety of different types of switches and/or actuators.

It is apparent from the above detailed description of preferred embodiments of the present invention, that the control system 14 provides the operator with direct and instant control over the speed of operation. This feeling of total control and responsiveness results in a very intuitive user interface that provides "delight" to the operator.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A system for controlling a displacement drive of a motor vehicle, said system comprising, in combination:
 a manually operable actuator movable over a fixed stroke between a first end position and a second end position;
 wherein the actuator is biased to a neutral position located between the first and second end positions;
 wherein the actuator provides a signal representative of position of the actuator along the stroke;
 a controller operably connected to the actuator and receiving the signal from the actuator;
 wherein the controller produces commands for a drive motor of the displacement drive device;
 wherein the commands vary speed of the drive motor based on the position of the actuator over the stroke; and
 wherein the speed of the drive motor must increase at greater rate at positions of the actuator near the first and second end positions than at positions of the actuator near the neutral position.

2. The system according to claim 1, wherein the speed of the drive motor is zero at the neutral position, increases in one direction as the actuator moves toward the first end position, and increases in the other direction as the actuator moves toward the second end position.

3. The system according to claim 2, wherein the drive motor is operated with a voltage higher than vehicle battery voltage when the actuator reaches the first and second end positions to obtain a boosted speed.

4. The system according to claim 1, wherein the neutral position is centrally located between the first and second end positions.

5. The system according to claim 1, wherein actuator rotates over the fixed stroke.

6. The system according to claim 5, wherein the neutral position is centrally located between the first and second end positions.

7. The system according to claim 1, wherein the drive motor is a reversible DC electric motor.

8. The system according to claim 1, wherein the actuator includes an analog sensor to provide the signal.

9. The system according to claim 1, wherein the actuator includes a digital sensor to provide the signal.

10. The system according to claim 1, wherein the actuator is a knob-type switch.

11. The system according to claim 1, wherein the actuator is a rocker-type switch.

12. The system according to claim 1, wherein the actuator is a slider-type switch.

13. A system for controlling a displacement drive of a motor vehicle, said system comprising, in combination:
 a manually operable actuator movable over a fixed stroke between a first end position and a second end position;
 wherein the actuator is biased to a neutral position centrally located between the first and second end positions;
 wherein the actuator provides a signal representative of position of the actuator along the stroke;
 a controller operably connected to the actuator and receiving the signal from the actuator;
 wherein the controller produces commands for a reversible DC electric motor of the displacement drive device;
 wherein the commands vary speed of the drive motor based on the position of the actuator over the stroke such that the speed of the drive motor is zero at the neutral position, increases in one direction as the actuator moves toward the first end position, and increases in the other direction as the actuator moves toward the second end position; and wherein the drive motor is operated with a voltage higher than vehicle battery voltage when the actuator is only at positions near the first and second end positions to obtain a boosted speeds for the drive motor only at the positions of the actuator near the first and second end positions.

14. The system according to claim 13, wherein actuator rotates over the fixed stroke.

15. A method for controlling a displacement drive of a motor vehicle, said method comprising steps of, in combination:
providing a manually operable actuator movable over a fixed stroke between a first end position and a second end position;
biasing the actuator to a neutral position located between the first and second end positions;
providing a signal from the actuator representative of position of the actuator along the stroke;
providing a controller operably connected to the actuator and receiving the signal from the actuator; produces commands for a drive motor of the displacement drive device;
varying speed of the drive motor based on the position of the actuator over the stroke; and
always increasing the speed of the drive motor at greater rate at positions of the actuator near the first and second end positions than at positions of the actuator near the neutral position.

16. The system according to claim 15, further comprising the step of varying the speed of the drive motor by making the speed zero at the neutral position, increasing the speed in one direction as the actuator moves toward the first end position, and increasing the speed in the other direction as the actuator moves toward the second end position.

17. The system according to claim 15, further comprising the step of operating the drive motor with a voltage higher than vehicle battery voltage when the actuator reaches the first and second end positions to obtain a boosted speed.

* * * * *